United States Patent
Tang et al.

(10) Patent No.: US 9,548,653 B2
(45) Date of Patent: Jan. 17, 2017

(54) PRE-BIAS STARTUP OF A CONVERTER

(71) Applicant: TEXAS INSTRUMENTS INCORPORATED, Dallas, TX (US)

(72) Inventors: Frank Tang, Shenzhen (CN); Kening Gao, Shenzhen (CN); Sheng Lin, Raleigh, NC (US); Danyang Zhu, Beijing (CN)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

(21) Appl. No.: 14/626,650

(22) Filed: Feb. 19, 2015

(65) Prior Publication Data
US 2016/0105094 A1  Apr. 14, 2016

Related U.S. Application Data

(63) Continuation of application No. PCT/CN2014/088402, filed on Oct. 11, 2014.

(51) Int. Cl.
*H02M 3/335* (2006.01)
*H02M 1/36* (2007.01)

(52) U.S. Cl.
CPC ........... *H02M 1/36* (2013.01); *H02M 3/33507* (2013.01); *H02M 3/33576* (2013.01)

(58) Field of Classification Search
CPC  H02M 1/36; H02M 3/33507; H02M 3/33569; H02M 3/33576; H02M 3/33592
USPC .................... 363/21.01, 21, 21.12
See application file for complete search history.

(56) References Cited

U.S. PATENT DOCUMENTS

| | | | | |
|---|---|---|---|---|
| 5,623,397 A | * | 4/1997 | Vinciarelli | H02M 3/33576 363/16 |
| 6,396,718 B1 | * | 5/2002 | Ng | H02M 3/33546 363/21.07 |
| 6,693,411 B2 | * | 2/2004 | Bub | H02M 3/156 323/222 |

(Continued)

FOREIGN PATENT DOCUMENTS

| | | |
|---|---|---|
| CN | 1379534 A | 11/2002 |
| CN | 1481066 A | 3/2004 |
| CN | 101170278 A | 4/2008 |

OTHER PUBLICATIONS

PCT Search Report dated May 5, 2015.
(Continued)

*Primary Examiner* — Timothy J Dole
*Assistant Examiner* — Htet Z Kyaw
(74) *Attorney, Agent, or Firm* — William B. Kempler; Chares A. Brill; Frank D. Cimino

(57) ABSTRACT

A method includes comparing, by a voltage-second (VS) controller, a first duty cycle used to control a first switch at a primary side of a power transformer of a DC-to-DC converter with a threshold. The method further includes if a value of the first duty cycle is less than the threshold, controlling, by the VS controller, a second duty cycle used to control a second switch at a secondary side of the power transformer, and maintaining a voltage level at an output voltage node at a non-zero value, and if the value of the first duty cycle is greater than the threshold, controlling, by an output voltage loop, the second duty cycle based on the first duty cycle, and monotonically increasing the voltage level the at the output voltage node from the non-zero value to a predetermined value.

18 Claims, 3 Drawing Sheets

(56) References Cited

U.S. PATENT DOCUMENTS

| | | | | |
|---|---|---|---|---|
| 7,589,982 B2* | 9/2009 | Wang | ................ | H02M 3/33592 |
| | | | | 363/21.06 |
| 8,385,087 B2* | 2/2013 | Coley | ............... | H02M 3/33538 |
| | | | | 363/21.06 |
| 8,792,257 B2* | 7/2014 | Berghegger | ...... | H02M 3/33507 |
| | | | | 363/21.15 |
| 8,823,346 B2* | 9/2014 | Walters | ............... | H02M 1/4225 |
| | | | | 323/266 |
| 8,891,268 B2 | 11/2014 | Sheng et al. | | |
| 8,912,769 B2* | 12/2014 | Lin | ..................... | H02M 3/1582 |
| | | | | 323/224 |
| 8,913,406 B2* | 12/2014 | Guthrie | ................... | H02M 1/36 |
| | | | | 363/49 |
| 8,929,106 B2* | 1/2015 | Reddy | ............................. | 363/49 |
| 8,976,547 B2* | 3/2015 | Ren | ........................ | H02M 1/32 |
| | | | | 363/21.14 |
| 9,099,929 B2* | 8/2015 | Tseng | ...................... | H02M 1/36 |
| 9,240,712 B2* | 1/2016 | Chandrasekaran | . | H02M 1/4225 |
| 9,407,151 B2* | 8/2016 | Zhang | ................ | H02M 3/33507 |
| 2006/0098465 A1* | 5/2006 | Fronk | ................ | H02M 3/33576 |
| | | | | 363/21.06 |
| 2007/0216391 A1* | 9/2007 | Blanken | ............ | H02M 3/33507 |
| | | | | 323/351 |
| 2008/0130322 A1* | 6/2008 | Artusi | .................. | H02M 1/4225 |
| | | | | 363/21.01 |
| 2011/0062926 A1* | 3/2011 | Qiu | ..................... | H02M 3/1588 |
| | | | | 323/282 |
| 2011/0109294 A1* | 5/2011 | Larson | ................... | H02M 1/36 |
| | | | | 323/285 |
| 2011/0205764 A1 | 8/2011 | Sheng et al. | | |
| 2014/0112027 A1* | 4/2014 | Tseng | ................ | H02M 3/33592 |
| | | | | 363/21.05 |
| 2014/0254215 A1* | 9/2014 | Brinlee | ............ | H02M 3/33507 |
| | | | | 363/21.15 |
| 2016/0118888 A1* | 4/2016 | Xu | ........................ | H02M 1/36 |
| | | | | 323/235 |

OTHER PUBLICATIONS

CN101170278A, English Machine Translation (8 pages).
CN1379534A, English Machine Translation (11 pages).
CN1481066A, English Machine Translation (8 pages).

* cited by examiner

PRE-BIAS STARTUP OF A CONVERTER

CROSS-REFERENCE TO RELATED APPLICATION

This is a continuation of copending International Application No. PCT/CN2014/088402, with an international filing date of Oct. 11, 2014, which designated the United States and is hereby fully incorporated herein by reference for all purposes.

BACKGROUND

In many voltage converters, a power metal oxide semiconductor field effect transistor (MOSFET), instead of a diode, is generally used as an active switch to rectify an output voltage of the voltage converter. Using such power MOSFET to rectify a voltage converter is commonly referred to as synchronous rectification or active rectification. For a low-voltage converter (operating around 10 V or less), the power MOSFET advantageously may be efficient in terms of power since the power MOSFET does not include a constant voltage drop, which is an intrinsic characteristic of a diode, causing a significant power loss.

SUMMARY

Systems and methods to control an output voltage level of a DC-to-DC converter are disclosed herein. In an embodiment, a DC-to-DC converter includes a power transformer having a primary side and a secondary side, a first switch coupled to the primary side of the transformer, a second switch coupled to the secondary side of the transformer, an inductor at the secondary side of the power transformer, a voltage-second (VS) controller coupled to the inductor, and an output voltage control loop coupled to the VS controller. The inductor is connected to an output voltage node and an inductor node. More specifically, the VS controller is configured to control, based on a primary side duty cycle for the first switch being less than a threshold, a secondary side duty cycle for the second switch so as to cause an integral of a voltage drop between the inductor node and the output voltage node to equal zero over a period of time. The output voltage control loop is configured to generate a first signal associated with the primary side duty cycle, wherein while the VS controller controls the secondary side duty cycle, a voltage level at the output voltage node maintains at a non-zero value.

In another embodiment, a DC-to-DC converter includes a power transformer having a primary side and a secondary side, an output voltage control loop coupled to an output voltage node at the secondary side of the power transformer, and a voltage-second (VS) controller coupled to the output voltage control loop. The output voltage control loop is configured to generate a first signal to control a first switch at the primary side of the power transformer, the first signal having a first duty cycle. The VS controller is configured to generate a second signal to control a second switch at the secondary side of the power transformer, the second signal having a second duty cycle. Further, while the first duty cycle is less than a threshold, the second duty cycle is determined by the VS controller. While the first duty cycle is greater than the threshold, the second duty cycle is determined based on the first duty cycle in a complementary manner.

In a further embodiment, a method includes comparing, by a voltage-second (VS) controller, a first duty cycle used to control a first switch at a primary side of a power transformer of a DC-to-DC converter with a threshold. The method further includes if a value of the first duty cycle is less than the threshold, controlling, by the VS controller, a second duty cycle used to control a second switch at a secondary side of the power transformer, and maintaining a voltage level at an output voltage node at a non-zero value, and if the value of the first duty cycle is greater than the threshold, controlling, by an output voltage loop, the second duty cycle based on the first duty cycle, and monotonically increasing the voltage level at the output voltage node from the non-zero value to a predetermined value.

BRIEF DESCRIPTION OF THE DRAWINGS

For a detailed description of exemplary embodiments of the invention, reference will now be made to the accompanying drawings in which.

NOTATION AND NOMENCLATURE

Figure 1:
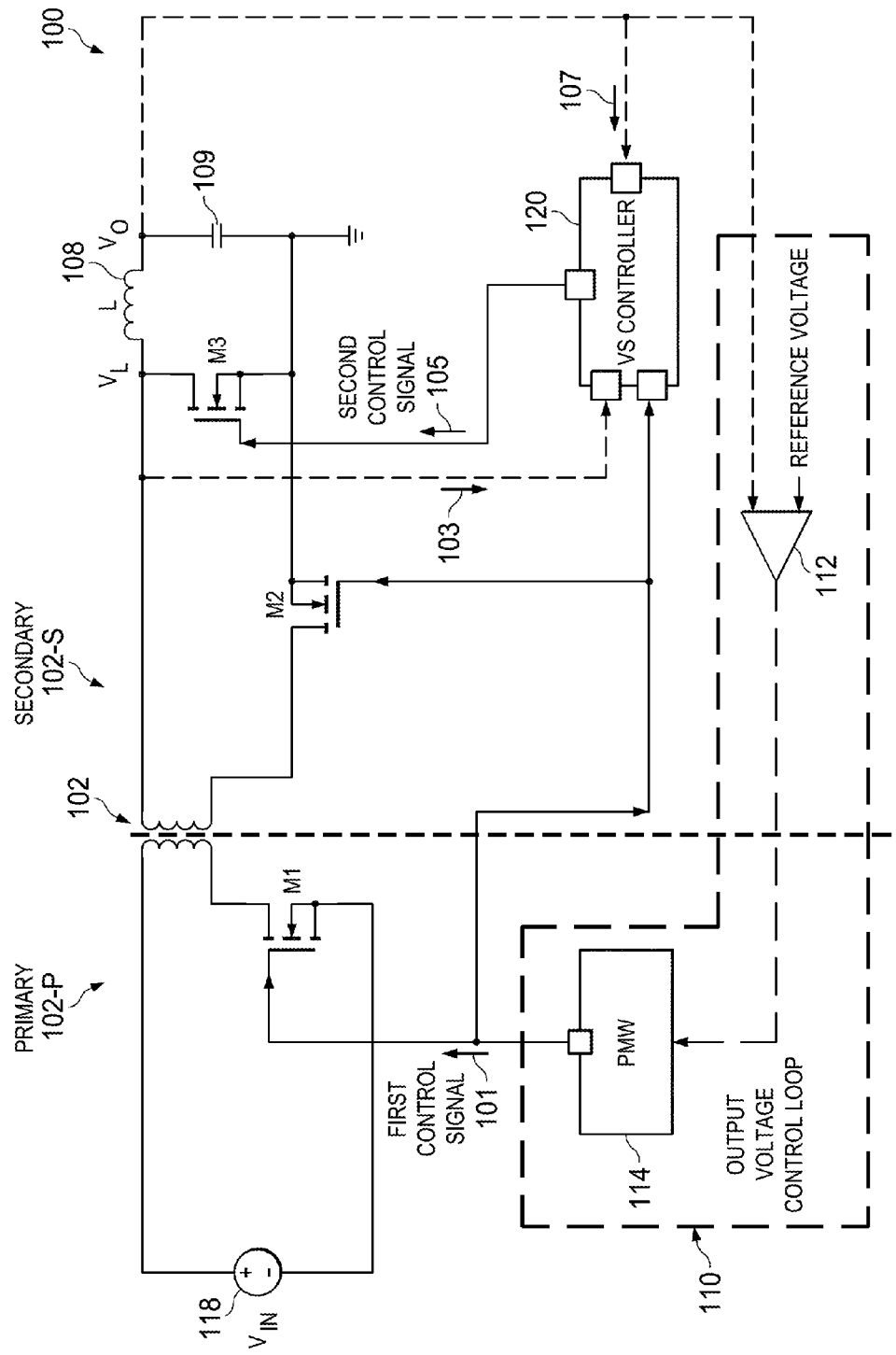
FIG. 1 shows a block diagram of a DC-to-DC converter including a voltage-second (VS) controller in accordance with various embodiments.

Certain terms are used throughout the following description and claims to refer to particular system components. As one skilled in the art will appreciate, companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . " Also, the term "couple" or "couples" is intended to mean either an indirect or direct connection. Thus, if a first device couples to a second device, that connection may be through a direct connection, or through an indirect connection via other devices and connections.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

To meet the ever-increasing demand for high speed and miniaturization of electronic devices (e.g., voltage converters), microelectronic circuit voltage levels have been reduced accordingly. In this regard, many electrical voltage converters use synchronous rectification (i.e., using a synchronous rectifier) to control the output voltage level. Using a synchronous rectifier may not only meet the demand for operating under a low-voltage level, but does so with increased efficiency.

More specifically, the voltage converter with the synchronous rectifier means that the voltage converter uses an actively controlled switch such as a transistor, usually a power metal oxide field effect transistor (MOSFET) or a power bipolar junction transistor (BJT), to control a characteristic of the converter. In one example, the characteristic to be controlled is an output voltage level of the converter.

Unfortunately, a voltage converter that employs such a transistor as a synchronous rectifier may be subject to a reverse current flow, that is, a reverse current which flows from an output of the voltage converter to an input of the voltage converter. Such a reverse current flow may be referred to a reverse direction flow of energy transport. This reverse current may cause a malfunction or shutdown to downstream voltage-sensitive electronic devices. The phenomenon of reverse current commonly occurs during start-up of the voltage converter.

Further, the voltage converter is generally implemented to provide electrical power to other device via an electrical bus. The devices may be different types of equipment, such as various types of integrated circuits. A situation that frequently occurs is that the device connected to the bus may pre-bias an output voltage of the voltage converter. In other words, at the moment when the voltage converter is switched on, there already exists a nonzero voltage at the voltage converter's output voltage node. As a result, voltage and current may be drained from the bus in reverse direction, until the output voltage has reached a level where the output voltage corresponds to a reference voltage, and thereafter ramps up in accordance with a normal startup behavior. As mentioned above, the reverse flow of current may cause severe damage to devices and/or circuits that are to be powered by the voltage converter from the electrical bus.

Conventionally, closed loop and open loop control circuits have been proposed attempting to solve the issue of reverse current at voltage converter startup due to a pre-biased voltage. In such attempted solutions, however, either an overshoot or an undershoot of the output voltage has been observed. That is, the reverse current is not completely eliminated in the proposed solutions. An extra discharging circuit may be included into the rectifier of the voltage converter to solve the issue of reverse current. However, using the extra discharging circuit generally requires extra components (e.g., a FET to provide an ORing function), which in turn increases cost to fabricate a voltage converter.

Embodiments of the disclosed invention eliminate the reverse current especially while the voltage converter is pre-biased. Based on a first duty cycle for a switch at a primary side of the voltage converter, the converter selectively controls a second duty cycle for a switch at a secondary side of the voltage converter. By selectively controlling the second duty cycle, the voltage converter may advantageously provide a monotonic (i.e., no overshoot and/or undershoot) startup behavior while the voltage converter is pre-biased.

In a preferred embodiment, the voltage converter is implemented as a direct current-to-direct current (DC-to-DC) buck converter. A buck converter is a voltage step down converter. However, the disclosed embodiments may also be used in a DC-to-DC boost converter, a forward converter, a flyback converter or any other suitable converter.

FIG. 1 shows a block diagram to illustrate the disclosed DC-to-DC converter 100 in accordance with various embodiments. The DC-to-DC converter 100 includes a power transformer 102, various switches M1, M2 and M3, a voltage-second (VS) controller 120, and an output voltage control loop 110. The DC-to-DC converter 100 also includes an input voltage source 118 and an output voltage node, $V_o$, which is connected to an inductor 108 and a capacitor 109. The input voltage source 118 is configured to provide a DC voltage, $V_{in}$. As mentioned above, the disclosed embodiment is preferably used in a DC-to-DC buck converter, which means that a voltage level at the output voltage node $V_o$ is smaller than the voltage (i.e., $V_{in}$) provided by the input voltage source 118. For ease of reference, the voltage level at the output voltage node $V_o$ is herein referred to as $V_o$.

As shown in FIG. 1, the power transformer 102 includes a primary side and a secondary side. The primary and secondary sides are designated as "102-p" and "102-s" respectively. In a preferred embodiment, each of the switches M1, M2, and M3 is configured to switch on and off alternately so as to regulate the output voltage $V_0$. Although the switches M1, M2 and M3 are preferably power metal oxide field effect transistors (MOSFETs), the switches can be any type of semiconductor device that is capable of switching on and off, such as diodes and/or bipolar junction transistors (BJTs).

Generally, a duty cycle is used to control an active and inactive time periods for the switch. A duty cycle is the percentage of one period in which a signal is active, and a period is the time it takes for the signal to complete one complete on and off cycle. In a preferred implementation, a first duty cycle (D1) is determined by the output voltage control loop 110, wherein the first duty cycle is to control the switches M1 and M2 (first control signal 101). A second duty cycle (D2) is selectively determined by the VS controller 120, wherein the second duty cycle is to control the switch M3 (second signal 105).

Referring still to FIG. 1, the output voltage control loop 110 includes a comparator 112 and a pulse width modulator (PWM) 114. The comparator 112 is configured to compare the output voltage $V_o$ of the converter 100 with a reference voltage. Based on the result of comparison, the PWM 114 is configured to generate the first control signal 101. The first control signal 101 is preferably a pulse-width modulated signal that pertains information of the first duty cycle D1, that is, the first control signal 101 is characteristic with the first duty cycle D1. Moreover, the first control signal 101 is provided to an input of the VS controller 120. Based on the first duty cycle D1 (first control signal 101), voltage levels at an inductor node $V_L$ (signal 103) and the output voltage node $V_{out}$ (signal 107), the VS controller 120 then determines the second duty cycle D2 for the second control signal 105 to be controlled by the VS controller 120 itself or changes the second duty cycle D2 accordingly with the first duty cycle D1.

To regulate the output voltage $V_o$, or more specifically to ramp up the output voltage $V_o$ from a pre-biased voltage level, the reference voltage fed into the input of the output voltage control loop 110 is generally used to guide the output voltage $V_o$. The reference voltage is provided by a voltage source, and thus the reference voltage is a monotonically increasing signal. In other words, the reference voltage is a signal that includes little or no undershoot or overshoot while the voltage increases.

To reach the monotonic startup behavior from a pre-biased voltage as mentioned, control of the output voltage $V_o$ is achieved even before the output voltage begins to ramp up from the pre-biased voltage. An embodiment of the disclosed invention uses the VS controller 120 to control a product of a voltage drop across the inductor 108 and time and to make the product equal zero so that a control of the switch M3, by the second control signal 105 characteristic with the second duty cycle D2, causes the output voltage $V_o$ to remain at a pre-biased voltage while the first duty cycle D1 is less than a threshold. In other words, the second duty cycle D2 is controlled by the VS controller 120 while the first duty cycle D1 is less than the threshold. In accordance with increasing the reference voltage, the first duty cycle D1 increases. Once the first duty cycle D1 reaches the threshold, the second duty cycle D2 is virtually controlled by the VS controller 120. At that point, the second duty cycle D2, used to control the switch M3, is determined from the first duty cycle D1. More specifically, a value of the second duty cycle D2 is complementarily determined based on the first duty cycle D1, that is, D2=1−D1. As such, a monotonic startup behavior of the output voltage from the pre-biased voltage may be provided. In summary, the second duty cycle D2 of the second control signal 105 is initially controlled by the VS controller 120 so as to remain the output voltage $V_o$ at the pre-biased level until the second duty cycle D2 reaches the threshold. After that time point of the first duty cycle D1 reaching the threshold, the control of the second duty cycle D2 is tied to the first duty cycle D1, and the output voltage $V_o$ monotonically ramps up to a predetermined voltage level in accordance with the reference voltage. Details of the DC-to-DC converter 100 to monotonically ramp up the output voltage $V_o$ in accordance with the reference voltage will be described with respect to waveforms in FIG. 3.

Figure 2:
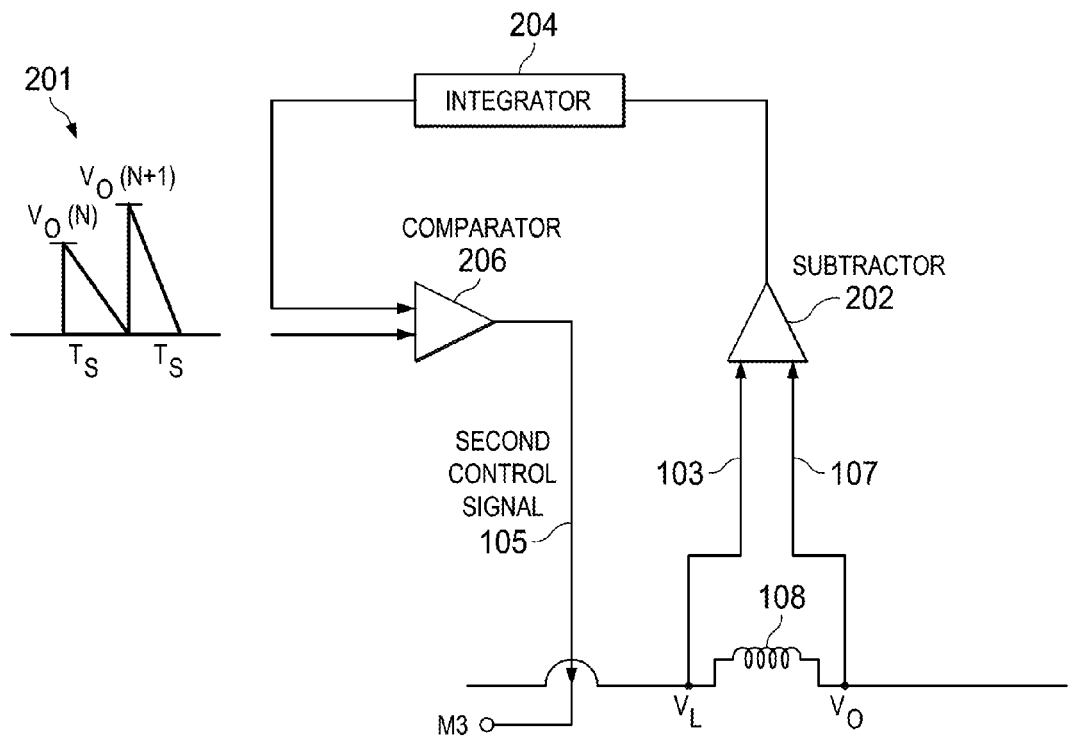
FIG. 2 shows an example to further illustrate a voltage-second (VS) controller of a DC-to-DC converter in accordance with various embodiments.

FIG. 2 shows a further illustration of the VS controller 120 in accordance with various embodiments. The VS controller 120 includes a subtractor 202, an integrator 204, and a comparator 206. The subtractor 202 is coupled to two terminal nodes of the inductor 108, that is, the output voltage node $V_O$ and the inductor node $V_L$. The subtractor 202 is configured to subtract a voltage level at the inductor node (signal 103) from the output voltage $V_o$ (signal 107). The difference in voltages is provided by the subtractor 202 to an input of the integrator 204 so that the result of subtraction is integrated over a period of time, $T_s$, to produce an integral value. In a preferred embodiment, the period of time $T_s$ is a period of the first control signal 101. More specifically, the period of time $T_s$ equals to a cycle of the time for the first duty cycle D1. As shown in FIG. 2, the integral value is provided to an input of the comparator 206. Another input of the comparator 206 is configured to receive a rippled signal 201, wherein the rippled signal 201 includes a period $T_s$. At the beginning of each period, the rippled signal 201 starts from the output voltage $V_o$, and transitions to zero by the end of the period $T_s$. Preferably, the comparator 206 is configured to compare the integral value and the output voltage $V_o$ so as to produce a pulse width modulated signal, that is, the signal 105. More specifically, the signal 105 may be represented as a signal characterized with the second duty cycle D2.

Figure 3:
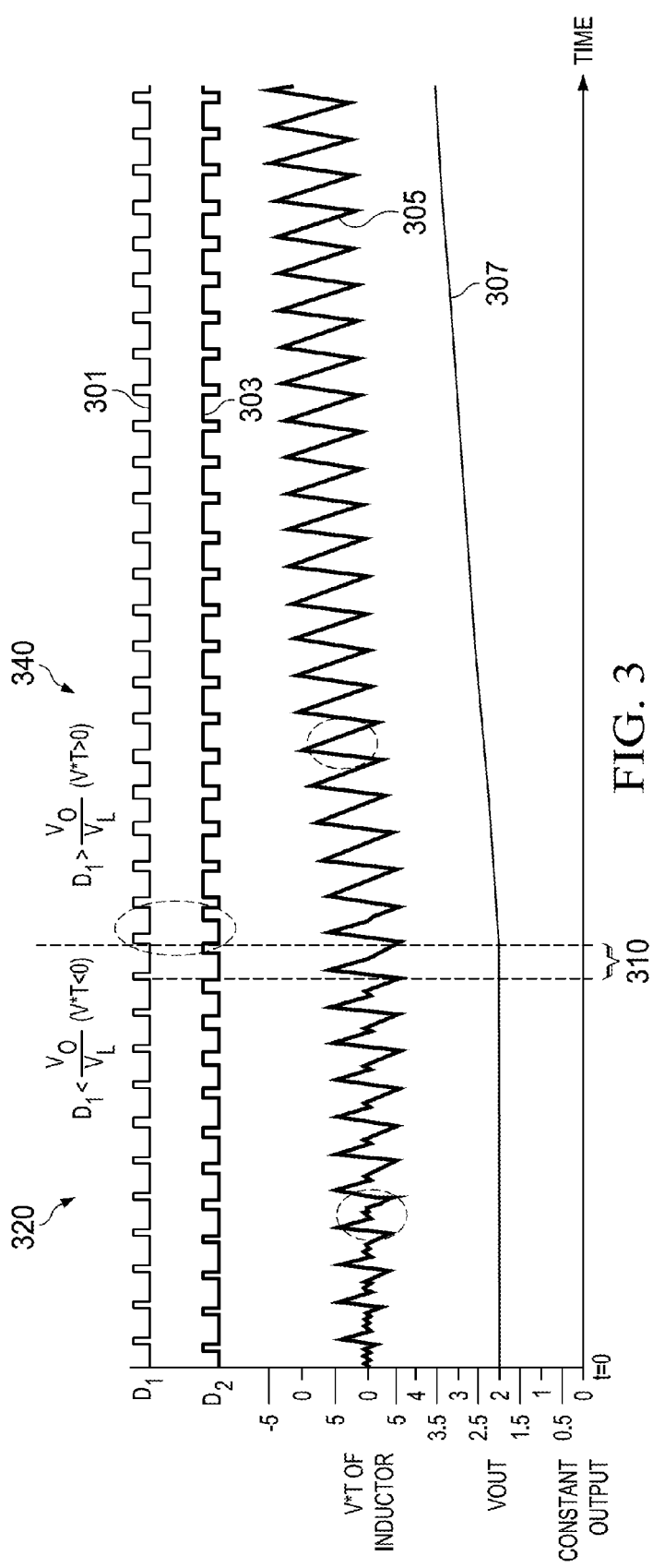
FIG. 3 shows an example of waveforms for various signals of a DC-to-DC converter in accordance with various embodiments.

FIG. 3 shows an example to illustrate time-varying waveforms 301, 303, 305, and 307 corresponding to the signals first control signal 101, second control signal 105 and output voltage 107 of the DC-to-DC converter 100 in accordance with various embodiments. The waveforms 301 and 303 represent the signals 101 and 105, respectively; the waveform 305 represents the product of the voltage drop across the inductor 108 and time; and the waveform 307 represents the output voltage $V_o$ varying with time. More particularly, in FIG. 3, a vertical dashed line splits the waveforms into two parts 320 and 340, wherein the dashed line corresponds to the threshold of the first duty cycle D1.

As illustrated by output voltage waveform 307, at time t=0, the DC-to-DC converter 100 is already pre-biased at a nonzero voltage level (e.g., 2V). Along with the first duty cycle D1 (waveform 301) increasing with time, the second duty cycle D2 (waveform 303) changes accordingly to ensure that an integral value, over a period of time (e.g., 310), of the waveform 305 equals zero. As such, the output voltage $V_o$ remains at the pre-biased voltage level (e.g., 2V) until the first duty cycle D1 (waveform 301) reaches the threshold. The threshold is determined dynamically, by the VS controller 120, based on the inductor voltage $V_L$ and the output voltage $V_o$. In a preferred embodiment, the threshold may be defined as a ratio of the output voltage $V_o$ to the inductor voltage $V_L$. In other words, the VS controller 120 continues to monitor the first duty cycle D1. Before the first duty cycle D1 reaching the threshold, $V_o/V_L$ (left part 320), the second duty cycle D2 is controlled by the VS controller 120 so that the output voltage $V_o$ was kept unchanged at the pre-biased voltage level.

Still referring to FIG. 3, as the first duty cycle D1 increases with time and exceeds the threshold (right part 340), the VS controller 120 releases the control of the second duty cycle D2. More specifically, a value of the second duty cycle D2 is determined by the VS controller 120 virtually based on the first duty cycle D1, that is, D2=1−D1. By "virtually," it is meant that while the first duty cycle D1 is less than the threshold (320), the VS controller 120 determines and controls the value of the second duty cycle D2. However, while the first duty cycle D1 is greater than the threshold (340), the value of the second duty cycle D2 is still controlled by the VS controller 120 but the value of D2 is completely determined based on D1. By implementing such selectively control on the second duty cycle D2, at an intersection of 320 and 340, the output voltage $V_o$ (waveform 307) starts to increase monotonically with the reference voltage (not shown) to a predefined voltage level. More particularly, at 340, since the second duty cycle D2 is no longer controlled by the VS controller 120 to make the output voltage $V_o$ unchanged, the integral value of the product of the voltage drop and the period of time (waveform 307) is not zero, and preferably larger than zero.

Figure 4:
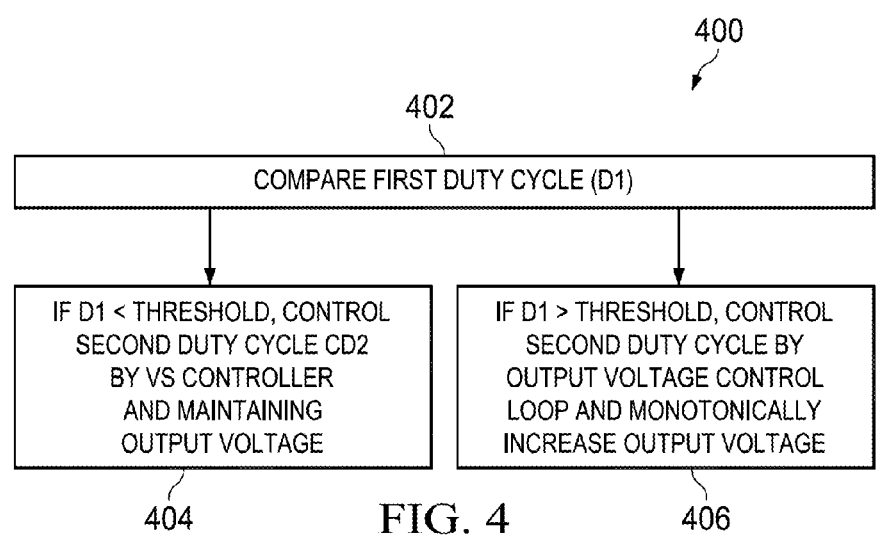
FIG. 4 shows a flow chart to explain a selective control on a second duty cycle of a DC-to-DC converter in accordance with various embodiments.

FIG. 4 shows a flow chart 400 to illustrate a method to control the output voltage of the DC-to-DC converter 100 in accordance with various embodiments. The flow chart 400 starts with block 402 comparing, by the VS controller 120, the first duty cycle D1 with the threshold ($V_o/V_L$). Preferably, the DC-to-DC converter 100 is a buck converter and the converter 100 is already pre-biased at a nonzero voltage level.

Continuing with the flow chart 400, the flow chart 400 provides two possibilities 404 and 406. If the first duty cycle D1 is less than the threshold, the flow chart 400 routes to the block 404; and if the duty cycle D1 is greater than the threshold, the flow chart 400 routes to the block 406.

At block 404, the second duty cycle D2 is controlled by the VS controller so that the integral value of the product of the voltage drop across the inductor 108 and the period of time equals zero. As such, the output voltage $V_o$ of the DC-to-DC converter 100 remains unchanged at the pre-biased voltage level.

On the other hand, at block 406, the control on the second duty cycle D2 is released from the VS controller 120. The value of the second duty cycle D2 is completely based on the first duty cycle D1 (D2=1−D1), which means that the second duty cycle D2 changes complementarily with the first duty cycle D1. More particularly, the first duty cycle D1 is determined by the output voltage control loop 110. As a result, the output voltage $V_o$ increases monotonically (i.e., no reverse current flowing through the inductor 108) with the reference voltage to a voltage level predefined by a user.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A DC-to-DC converter, comprising:
   a power transformer having a primary side and a secondary side;
   a first switch coupled to the primary side of the transformer;
   a second switch coupled to the secondary side of the transformer;
   an inductor, at the secondary side of the power transformer, connected to an output voltage node and an inductor node;
   a voltage-second (VS) controller coupled to the inductor and configured to measure a voltage across the inductor in order to attain a measure of the volt-seconds across the inductor and configured to control, based on a first duty cycle for the first switch being less than a threshold, a second duty cycle for the second switch so as to cause an integral of a voltage drop between the inductor node and the output voltage node to equal zero over a period of time; and
   an output voltage control loop coupled to the VS controller and configured to generate a first signal associated with the first duty cycle;
   wherein while the VS controller controls the second duty cycle, a voltage level at the output voltage node maintains at a non-zero pre-bias value.

2. The DC-to-DC converter of claim 1 wherein the time period is a period of the first signal.

3. The DC-to-DC converter of claim 1 wherein the VS controller is to generate a second signal associated with the second duty cycle to control the second switch to turn on and off alternately in accordance with the second duty cycle.

4. The DC-to-DC converter of claim 3 wherein the VS controller comprises a subtractor, an integrator, and a comparator, the subtractor is configured to generate a subtracted value that equals a difference between the voltage levels at the output voltage node and the inductor node, the integrator is coupled to the subtractor and configured to integrate the subtracted value over the period of time to produce an integral value, and the comparator is configured to compare the integral value and the voltage at the output voltage node so as to generate the second signal.

5. The DC-to-DC converter of claim 1 wherein the VS controller is to release the control of the second duty cycle while the first duty cycle is greater than the threshold.

6. The DC-to-DC converter of claim 5 wherein while the control of the second duty cycle is released, the second duty cycle is to change with the first duty cycle in a complementary manner so as to cause the voltage at the output voltage node to ramp monotonically from the non-zero value to a predetermined value.

7. The DC-to-DC converter of claim 1 wherein the threshold is a ratio of voltage levels between the inductor node and the output voltage node.

8. A DC-to-DC converter, comprising:
   a power transformer having a primary side and a secondary side; an inductor, at the secondary side of the power transformer, connected to an output voltage node and an inductor node; an output voltage control loop coupled to the output voltage node at the secondary side of the power transformer and configured to generate a first signal to control a first switch at the primary side of the power transformer, the first signal having a first duty cycle; and
   a voltage-second (VS) controller coupled to the output voltage control loop and configured to measure a voltage across the inductor in order to attain a measure of the volt-seconds across the inductor and configured to generate a second signal to control a second switch at the secondary side of the power transformer, the second signal having a second duty cycle;
   wherein while the first duty cycle is less than a threshold, the second duty cycle is calculated by the VS controller in order to maintain an output voltage at a non-zero pre-bias value;
   wherein while the first duty cycle is greater than the threshold, the second duty cycle is determined based on the first duty cycle in a complementary manner.

9. The DC-to-DC converter of claim 8 further comprising an inductor that couples to the VS controller and connects to the output voltage node and an inductor node at the secondary side of the power transformer.

10. The DC-to-DC converter of claim 8 wherein the second duty cycle is calculated by the VS controller so as to cause an integral of a voltage drop between the inductor node and the output voltage node, over a period of time, to equal zero.

11. The DC-to-DC converter of claim 10 wherein the period of time is a period of the first signal.

12. The DC-to-DC converter of claim 10 wherein the VS controller further comprises a subtractor, an integrator, and a comparator, the subtractor is configured to generate a subtracted value that equals a difference between the voltage levels at the output voltage node and the inductor node, the integrator is coupled to the subtractor and configured to integrate the subtracted value over the period of time to produce an integral value, and the comparator is configured to compare the integral value and the voltage at the output voltage node so as to generate the second signal.

13. The DC-to-DC converter of claim 8 wherein the threshold is a ratio of the voltage level at the inductor node to the voltage level at the output voltage node.

14. The DC-to-DC converter of claim 8 wherein while the second duty cycle is calculated by the VS controller, the voltage level at the output voltage node remains at a non-zero value.

15. The DC-to-DC converter of claim 8 wherein while the first duty cycle is greater than the threshold, the second duty cycle equals one being subtracted from the first duty cycle and the voltage level at the output voltage node ramps monotonically to a voltage level along with a reference voltage.

16. The DC-to-DC converter of claim 15 wherein the reference voltage is an input for the output voltage control loop.

17. A method, comprising:
   comparing, by a voltage-second (VS) controller, a first duty cycle used to control a first switch at a primary side of a power transformer of a DC-to-DC converter with a threshold;
   if a value of the first duty cycle is less than the threshold, measuring a voltage across an inductor at the secondary side of the power transformer to attain a measure of the volt-seconds across the inductor node and an output voltage node; and controlling, by the VS controller, a second duty cycle used to control a second switch at the secondary side of the power transformer, and maintaining a voltage level at the output voltage node at a non-zero pre-bias value; and if the value of the first duty cycle is greater than the threshold, controlling, by an output voltage loop, the second duty cycle based on the first duty cycle, and monotonically increasing the voltage level at the output voltage node from the non-zero pre-bias value to a predetermined value.

18. The method of claim 17 wherein the threshold is a ratio of voltage levels between an inductor node and the output voltage node of the DC-to-DC converter.

* * * * *